R. THIEL.
RADIATOR.
APPLICATION FILED SEPT. 27, 1910.
982,163.
Patented Jan. 17, 1911.
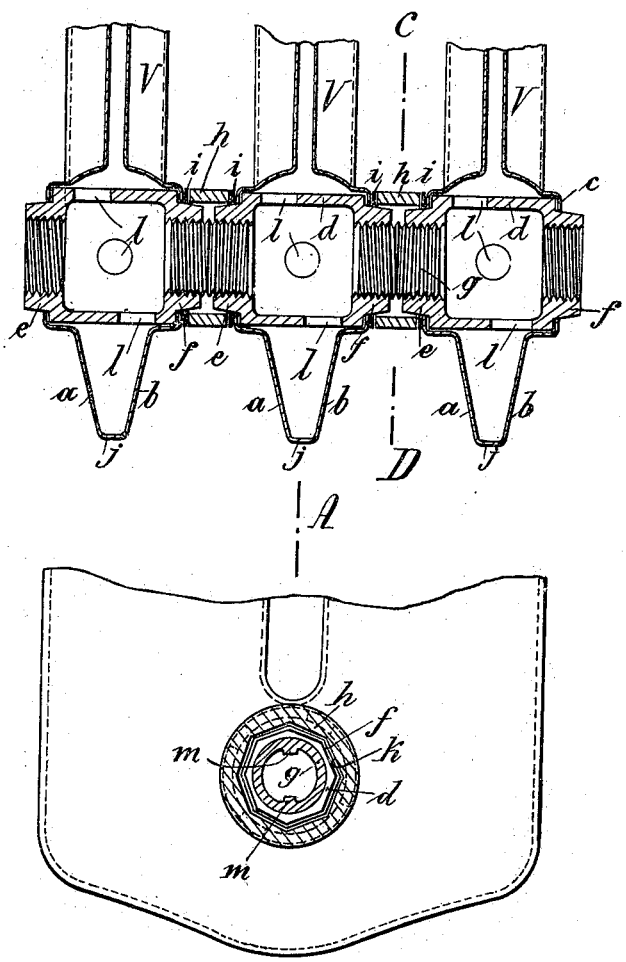

UNITED STATES PATENT OFFICE.

RUDOLF THIEL, OF LÜBECK, GERMANY.

RADIATOR.

982,163.  Specification of Letters Patent.  Patented Jan. 17, 1911.

Application filed September 27, 1910.  Serial No. 584,025.

*To all whom it may concern:*

Be it known that I, RUDOLF THIEL, a citizen of the Empire of Germany, residing at Lübeck, in the Empire of Germany, have invented a new and useful Radiator, of which the following is a specification.

My invention relates to radiators composed of parallel vessels made from sheet metal, and tubular connections between the upper and lower ends of the vessels, and consists of improvements in such radiators, whereby the composition of the several parts is considerably facilitated and the packing rings are protected from destruction during the screwing together of the tubular connections.

I will now proceed to describe my invention with reference to the accompanying drawing, in which—

Figure 1 is a vertical longitudinal section through the lower part of a radiator with three parallel vessels on the line A—B in Fig. 2, and Fig. 2 is a vertical cross section through the line C—D in Fig. 1.

Similar letters of reference refer to similar parts in both views.

The radiator shown comprises three parallel vessels V V, which may be essentially rectangular (Fig. 2) with rounded-off corners or may have any other shape. Each vessel V is made in halves $a$ and $b$ from sheet metal, these portions being formed by pressing or stamping and welded together along the edges at $j$, say by means of an oxyhydrogen-blowpipe or otherwise, whereby a perfectly closed vessel is produced. Each vessel V is made with two connections $c$ one at the top and the other at the bottom and the vessel V where said connection $c$ is made is provided with a polygonal opening $k$. I provide for each vessel V two cast metallic hollow bodies $d$, one at the top and the other at the bottom. Each hollow body $d$ is provided within the vessel V with several holes $l\ l$, through which the heating medium is permitted to circulate. Each hollow body $d$ has two opposite tubular connections $e$ and $f$, which are polygonal on the outside and made to taper outwardly, so that they can easily engage in the polygonal holes $k$ of the halves $a$ and $b$ and are thereby prevented from turning. The two tubular connections $e$ and $f$ of each hollow body $d$ are provided with female screw-threads opposite to one another. When putting together any two vessels V V, their hollow bodies $d\ d$ can be brought into line with one another, so that a short tube piece $g$ provided on the outside with two opposite screw-threads and on the inside with two longitudinal projections $m\ m$ (Fig. 2) can be inserted between any two opposite tubular connections $e$ and $f$ and simultaneously screwed into them by means of a suitably formed key (not shown), which is introduced from without through the opposite tubular connection $e$ or $f$ of either hollow body $d$ and is adapted to engage the two inner projections $m\ m$ of the tube piece $g$. A distance piece $h$ made circular on the outside and polygonal on the inside is put over the ends of any two opposite connections $e$ and $f$ of two vessels V V and is adapted to compress two packing rings $i\ i$ inserted between its end faces and the end faces of the connections $c\ c$, on the key being turned for simultaneously screwing the opposite screw-threads of the tube piece $g$ into the female threads of the two opposite tubular connections $e$ and $f$ to be connected. Each vessel V is finished in the manner, that before putting together its halves $a$ and $b$ first the two hollow bodies $d$ are introduced into their holes $k$, after which the halves $a$ and $b$ are welded together along their edges at $j$ (Fig. 1). For putting together two vessels V V, first packing rings $i\ i$ are put over the opposite tubular connections $e$ and $f$ of the bodies $d\ d$ contained in the two vessels. Then two distance pieces $h$ are put on and two tube pieces $g$ are inserted between the bodies $d$, after which preferably two keys are simultaneously employed, one at the top and the other at the bottom, for screwing together the two vessels V V in the manner described above. As the packing rings $i\ i$ are subjected to compression only by the distance pieces $h$ and not to friction by nuts to be turned as usual, they are protected from destruction. Each radiator may comprise any number of vessels V V connected together in the manner described.

I claim:

A radiator comprising a plurality of parallel sheet metal vessels each provided with a pair of polygonal openings; a hollow body within each vessel having tubular ends, polygonal outside, projecting through and engaging said openings the adjacent ends of hollow bodies belonging to adjacent vessels being oppositely screw threaded inside, tube pieces having oppositely screw threaded ends for drawing said tubular ends together; distance pieces surrounding said tubular ends between adjacent vessels; and packing means about said tubular ends for prevening leakage; substantially as and for the purpose described.

RUD. THIEL.

Witnesses:
 JOHN WULF,
 HANS VOGT.